United States Patent
Nilsson et al.

(10) Patent No.: US 11,800,440 B2
(45) Date of Patent: *Oct. 24, 2023

(54) AMF RELOCATION WITH N3IWF HANDLING

(71) Applicant: Telefonaktiebolaget LM Ericsson (publ), Stockholm (SE)

(72) Inventors: Daniel Nilsson, Älvängen (SE); Qian Chen, Mölndal (SE); Stefan Rommer, Västra Frölunda (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

This patent is subject to a terminal disclaimer.

(21) Appl. No.: 17/522,592

(22) Filed: Nov. 9, 2021

(65) Prior Publication Data

US 2022/0070768 A1 Mar. 3, 2022

Related U.S. Application Data

(63) Continuation of application No. 16/611,711, filed as application No. PCT/EP2018/061509 on May 4, 2018, now Pat. No. 11,178,603.

(Continued)

(51) Int. Cl.
*H04W 48/18* (2009.01)
*H04W 76/11* (2018.01)
(Continued)

(52) U.S. Cl.
CPC ............ *H04W 48/18* (2013.01); *H04W 8/08* (2013.01); *H04W 8/22* (2013.01); *H04W 12/06* (2013.01);

(Continued)

(58) Field of Classification Search
CPC ....... H04W 48/18; H04W 8/08; H04W 60/00; H04W 76/11; H04W 8/22; H04W 12/06;
(Continued)

(56) References Cited

U.S. PATENT DOCUMENTS 11,178,603 B2 * 11/2021 Nilsson et al. ....... H04W 48/18
2017/0303259 A1 * 10/2017 Lee et al. ............ H04W 72/048

(Continued)

OTHER PUBLICATIONS

Faccin et al.; With the Traditional Radio Access Technology Interworking for Connection to the Next Generation Core Network; CN 108886730 A (Year: 2018).*

(Continued)

*Primary Examiner* — Meless N Zewdu
(74) *Attorney, Agent, or Firm* — Rothwell, Figg, Ernst & Manbeck, P.C.

(57) ABSTRACT

A method performed by a serving Access and Mobility Management Function (AMF) serving a wireless communication device. The method includes receiving, from a target AMF, a request for information regarding the wireless communication device. The method also includes submitting, in reply to the request for information, a current user equipment (UE) context of the wireless communication device and an identifier of an ongoing non 3rd Generation Partnership Project (non-3GPP) access Protocol Data Unit (PDU) session for the wireless communication device. The method further includes notifying a Non-3GPP Interworking Function (N3IWF) to remove the current UE context, wherein the N3IWF is configured to enable the wireless communication device to attach to the core network over non-3GPP access.

10 Claims, 5 Drawing Sheets

Related U.S. Application Data

(60) Provisional application No. 62/503,631, filed on May 9, 2017.

(51) Int. Cl.
    | | |
    |---|---|
    | *H04W 8/08* | (2009.01) |
    | *H04W 8/22* | (2009.01) |
    | *H04W 12/06* | (2021.01) |
    | *H04W 60/00* | (2009.01) |
    | *H04W 84/04* | (2009.01) |

(52) U.S. Cl.
    CPC ............ *H04W 60/00* (2013.01); *H04W 76/11* (2018.02); *H04W 84/042* (2013.01)

(58) Field of Classification Search
    CPC ... H04W 84/042; H04W 8/082; H04W 8/085; H04W 8/087; H04W 8/10; H04W 8/12; H04W 8/14; H04W 48/04; H04W 8/16; H04W 8/26; H04W 48/00; H04W 48/02; H04W 48/20; H04W 48/16; H04W 48/014; H04W 60/003; H04W 64/00; H04W 76/00; H04W 76/10; H04W 76/15; H04W 88/00; H04W 88/02; H04W 88/08; H04W 88/18; H04W 88/16; H04W 88/10; H04L 67/563; H04L 67/564
    See application file for complete search history.

(56) References Cited

U.S. PATENT DOCUMENTS

| | | | |
|---|---|---|---|
| 2018/0227699 A1 | 8/2018 | Kim et al. | |
| 2018/0270781 A1 | 9/2018 | Baek et al. | |
| 2018/0317157 A1 | 11/2018 | Baek et al. | |
| 2018/0352483 A1* | 12/2018 | Youn et al. | ....... H04W 36/0011 |
| 2019/0021064 A1* | 1/2019 | Ryu et al. | ............ H04W 60/06 |
| 2019/0335330 A1 | 10/2019 | Salkintzis | |
| 2019/0394682 A1 | 12/2019 | Zhu et al. | |
| 2020/0008264 A1 | 1/2020 | Kang et al. | |
| 2020/0015131 A1 | 1/2020 | Ying | |
| 2020/0037386 A1 | 1/2020 | Park et al. | |
| 2020/0077356 A1 | 3/2020 | Youn et al. | |
| 2020/0100101 A1 | 3/2020 | Torvinen et al. | |
| 2020/0145910 A1* | 5/2020 | Jangid et al. | ......... H04W 48/16 |
| 2020/0163145 A1* | 5/2020 | Park et al. | ............ H04W 76/18 |
| 2020/0170055 A1* | 5/2020 | Dou et al. | ............ H04W 76/12 |
| 2020/0245284 A1 | 7/2020 | Hans | |

OTHER PUBLICATIONS

3GPP TS 23.501 V1.0.0 (Jun. 2017), 3rd Generation Partnership Project; Technical Specification Group Services and System Aspects; System Architecture for the 5G System; Stage 2 (Release 15), Jun. 2017 (146 pages).

3GPP TS 23.502 V0.4.0 (May 2017), 3rd Generation Partnership Project; Technical Specification Group Services and System Aspects; Procedures for the 5G System; Stage 2 (Release 15), May 2017 (126 pages).

International Search Report and Written Opinion issued in International Application No. PCT/EP2018/061509 dated Aug. 21, 2018 (14 pages).

3GPP TS 23.502 V0.3.0 (Mar. 2017), 3rd Generation Partnership Project; Technical Specification Group Services and System Aspects; Procedures for the 5G System; Stage 2 (Release 15) Mar. 2017, (116 pages).

3GPP TS 23.501 V0.4.0 (Apr. 2017), 3rd Generation Partnership Project; Technical Specification Group Services and System Aspects; System Architecture for the 5G System; Stage 2 (Release 15) Apr. 2017, (123 pages).

* cited by examiner

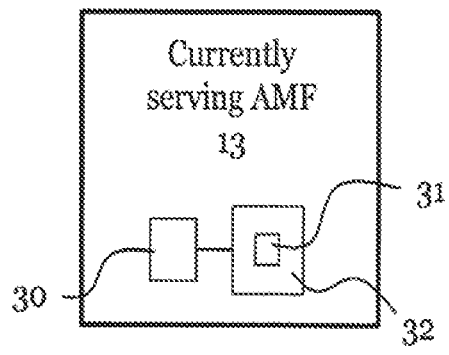
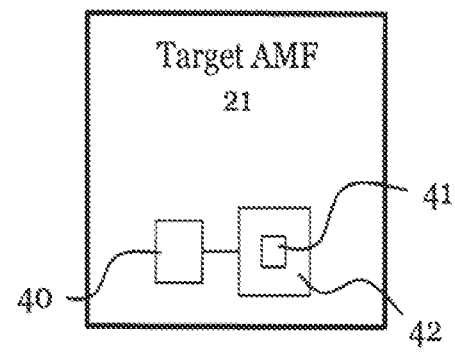
Fig. 5                    Fig. 6
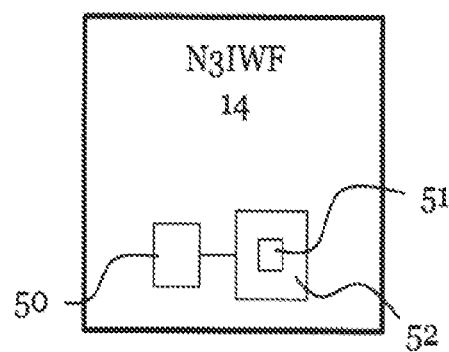
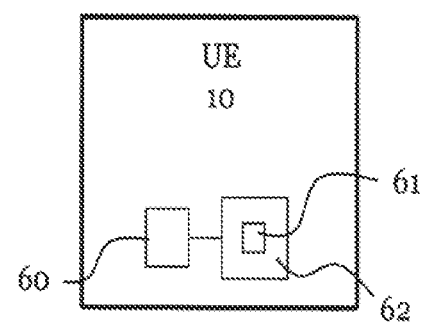
Fig. 7                    Fig. 8

AMF RELOCATION WITH N3IWF HANDLING

This application is a continuation of U.S. application Ser. No. 16/611,711, filed on Nov. 7, 2019, which is a 35 U.S.C. § 371 National Stage of International Patent Application No. PCT/EP2018/061509, filed May 4, 2018 and claiming priority to U.S. provisional application No. 62/503,631, filed on May 9, 2017. The above identified applications are incorporated by reference.

TECHNICAL FIELD

The invention relates to methods and devices for enabling relocation of Access and Mobility Management Functions (AMFs).

BACKGROUND

In fifth generation (5G) wireless communication systems, with reference to FIG. 1, a wireless communication device, such as a mobile phone, a tablet, a smart watch, etc., commonly referred to as user Equipment (UE) may registered for both 3GPP ("3rd Generation Partnership Project") and non-3GPP access with a core network 100.

FIG. 1 illustrates such a scenario where a UE 10 register for 3GPP access with the core network 100 via a 3GPP Access Network (AN) 11, while registering for non-3GPP access with the core network 100 via a non-3GPP AN 12.

When the UE 10 is registered for both 3GPP and non-3GPP access in a same Public Land Mobile Network (PLMN), a single Access and Mobility Management Function (AMF) 13 shall be used for the UE 10. The AMF is responsible for functions such as registration, connection and mobility management.

It is assumed that for non-3GPP access, a Non-3GPP Interworking Function (N3IWF) 14 enabling the UE 10 to attach to a 5G core network provides coverage of the entire non-3GPP access area in the PLMN and no AMF change is needed.

However, for the 3GPP access, the service area of the AMF 13 may not cover the entire PLMN and AMF re-selection may thus be required during mobility when the UE 10 leaves the coverage area of a current AMF 13.

A UE first registered for 3GPP access may perform a second registration for non-3GPP access. Now, AMF selection is required by the N3IWF 14. The N3IWF 14 covers the entire PLMN for non-3GPP access and therefore the selected AMF 13 for 3GPP access can be used also for non-3GPP access and no AMF relocation is needed.

For the case where the UE 10 first registers for non-3GPP access and then performs a second registration for 3GPP access in the same PLMN, it is possible that a new AMF need to be selected. It is noted that AMF re-selection also may have to be undertaken in a case where the UE 10 is registered for non-3GPP access and 3GPP access but undergoes a 3GPP mobility procedure.

With further reference to FIG. 1, a Session Management Function (SMF) 15 is responsible for e.g. session establishment, modify and release and lawful intercept, and a user Plane function (UPF) 16 serves as a Protocol Data Unit (PDU) session point for interconnection to a Data Network, the PDU session being an association between the UE 10 and the Data Network 17 that provides a PDU connectivity service. The type of association can be IP, Ethernet or unstructured.

Further shown in FIG. 1 are an Authentication Server Function (AUSF) 18 for authenticating the UE 10, a Unified Data Management (UDM) unit 19 and a Policy and Charging Function (PCF) 20.

As is described in 3GPP technical specification TS 23.501 "System Architecture for the 5G System" under section 5.3.2.4 "Support of a UE registered over both 3GPP and Non3GPP access", for a given serving PLMN there is one Registration Management (RM) context for a UE for each access, e.g. when the UE is consecutively or simultaneously served by a 3GPP access and a non-3GPP access of the PLMN.

An AMF associates multiple access-specific RM contexts for an UE with: a Temporary Identifier that is common between 3GPP and non-3GPP. This Temporary Identifier is globally unique, a registration state per access type (3GPP/non-3GPP), a registration area per access type: one registration area for 3GPP access and another registration area for non-3GPP access, and a periodic registration timer for 3GPP access.

Registration areas for the 3GPP access and the non-3GPP access are independent. A UE shall not perform periodic registration update over a non-3GPP access.

The AMF assigns to the UE a single Temporary Identifier that is used over 3GPP and non-3GPP access. The Temporary Identifier is assigned upon the first successful registration of the UE, and is valid over any of both 3GPP and non-3GPP access for the UE. Upon performing any initial access over the non-3GPP access or over the 3GPP access, the UE provides the Temporary Identifier it has received in earlier successful registration over any access. This enables the AN to select an AMF that maintains the UE context created at the previous registration procedure, and enables the AMF to correlate the UE request to the existing UE context. The Temporary identifier may be assigned or re-assigned over any of the 3GPP and non-3GPP access.

When the UE is successfully registered to an access (3GPP access or non-3GPP access, respectively) and the UE registers via the other access:

(a) if the second access is located in the same PLMN (e.g. the UE is registered via a 3GPP access and selects a N3IWF located in the same PLMN), the UE shall use for the registration via the new access the Temporary Identifier that the UE has been provided at the previous registration in the same PLMN;

(b) if the second access is located in a PLMN different from the PLMN of the first access (e.g. the UE is registered to a 3GPP access and selects a N3IWF located in a PLMN different from the PLMN of the 3GPP access, or the UE is registered over non-3GPP and registers to a 3GPP access in a PLMN different from the PLMN of the N3IWF), the UE shall use for the registration to the new access a Temporary Identifier only if it has got one that was received from the same PLMN.

When a UE Temporary Identifier assigned during a registration procedure over 3GPP (e.g. the UE registers first over a 3GPP access) is location-specific, e.g. refers to a geographical Group Id, the same UE Temporary Identifier can be re-used over the non-3GPP access when the selected N3IWF function is in the same PLMN as the 3GPP access.

However, when a UE Temporary Identifier assigned during a registration procedure performed over a non-3GPP access (e.g. the UE registers first over a non-3GPP access) refers to a non-geographical Group Id, the Temporary Identifier may not be valid for Non-Access Stratum (NAS)

procedures over the 3GPP access and during a registration procedure over the 3GPP access an AMF relocation is needed.

Hence, there is currently no solution provided for the PDU session handling when a UE already registered for PDU sessions over non-3GPP access performs a second registration over 3GPP access and an AMF change is required.

SUMMARY

An objective of the invention is to overcome one or more of these problems in the art.

In a first aspect of the invention a method performed by an AMF serving a wireless communication device in a core network is provided of enabling re-location of the wireless communication device to a target AMF via which the wireless communication device registers over 3GPP access with the core network, where the wireless communication device is registered with the serving AMF of the core network over non-3GPP access in a same PLMN as the 3GPP access, comprising receiving, from the target AMF, a request for information regarding the wireless communication device registering for 3GPP access with the core network, submitting, in reply to the request for information, current user equipment (UE) context of the wireless communication device and an identifier of any ongoing non-3GPP access Protocol Data Unit (PDU) session for the wireless communication device, notifying a Non-3GPP Interworking Function (N3IWF) enabling the wireless communication device to attach to the core network over non-3GPP access, to remove the current UE context.

In a second aspect an AMF, serving a wireless communication device in a core network is provided, configured to enable re-location of the wireless communication device to a target AMF via which the wireless communication device registers over 3GPP access with the core network, where the wireless communication device is registered with the serving AMF of the core network over non-3GPP access in a same PLMN as the 3GPP access, comprising a processing unit and a memory, said memory containing instructions executable by said processing unit, whereby said serving AMF is operative to: receive, from the target AMF, a request for information regarding the wireless communication device registering for 3GPP access with the core network, submit, in reply to the request for information, current user equipment (UE) context of the wireless communication device and an identifier of any ongoing non-3GPP access Protocol Data Unit (PDU) session for the wireless communication device, and notify a Non-3GPP Interworking Function (N3IWF) enabling the wireless communication device to attach to the core network over non-3GPP access, to remove the current UE context.

In a third aspect a method performed by a target AMF of a core network of registering a wireless communication device 3GPP access with the core network is provided, where the wireless communication device currently is registered with the core network over non-3GPP access in a same PLMN as the 3GPP access, comprising receiving a request of the wireless communication device to register for 3GPP access with the core network, acquiring current UE context of the wireless communication device, an identifier of any ongoing non-3GPP access PDU session from an AMF currently serving the wireless communication device in the core network, and destination information for an N3IWF associated with the wireless communication device for enabling the wireless communication device to attach to the core network, notifying a Session Management Function (SMF) handling the ongoing non-3GPP access PDU session of the wireless communication device that the wireless communication device will be relocated from the currently serving AMF to the target AMF, notifying the N3IWF designated by the destination information to redirect any further signalling of the wireless communication device from the currently serving AMF to the target AMF, and notifying the wireless communication device that the registration with the target AMF for a 3GPP access is successful.

In a fourth aspect a target AMF of a core network is provided configured to register a wireless communication device over 3GPP access with the core network, where the wireless communication device currently is registered with the core network over non-3GPP access in a same PLMN as the 3GPP access, comprising a processing unit and a memory, said memory containing instructions executable by said processing unit, whereby said target AMF is operative to receive a request of the wireless communication device to register for 3GPP access with the core network, acquire current user equipment (UE) context of the wireless communication device, an identifier of any ongoing non-3GPP access Protocol Data Unit (PDU) session from an AMF currently serving the wireless communication device in the core network, and destination information for a Non-3GPP Interworking Function (N3IWF) associated with the wireless communication device for enabling the wireless communication device to attach to the core network, notify a Session Management Function (SMF) handling the ongoing non-3GPP access PDU session of the wireless communication device that the wireless communication device will be relocated from the currently serving AMF to the target AMF, notify the N3IWF designated by the destination information to redirect any further signalling of the wireless communication device from the currently serving AMF to the target AMF; and notify the wireless communication device that the registration with the target AMF for a 3GPP access is successful.

In a sixth aspect an N3IWF enabling a wireless communication device to attach to a core network over non-3GPP access is provided, configured to facilitate re-location of the wireless communication device from an Access and Mobility Management Function (AMF) currently serving the wireless communication device over non-3GPP access to the core network, to a target AMF which is to serve the wireless communication device over 3GPP access to the core network, comprising a processing unit and a memory, said memory containing instructions executable by said processing unit, whereby said N3IWF is operative to receive, from the target AMF, a request to redirect any further signalling of the wireless communication device from the currently serving AMF to the target AMF; and redirect any signalling of the wireless communication device to the target AMF.

In a fifth aspect a method performed by an N3IWF enabling a wireless communication device to attach to a core network over non-3GPP access, to facilitate re-location of the wireless communication device from an AMF currently serving the wireless communication device over non-3GPP access to the core network, to a target AMF which is to serve the wireless communication device over 3GPP access to the core network, comprising receiving, from the target AMF, a request to redirect any further signalling of the wireless communication device from the currently serving AMF to the target AMF, and redirecting any signalling of the wireless communication device to the target AMF.

In a seventh aspect of the invention, a method performed by a wireless communication device of accessing a core network is provided, the wireless communication device being registered with the core network over non-3GPP access with a currently serving AMF and further requests 3GPP access to the core network with a target AMF in a same PLMN as the non-3GPP access, comprising submitting a request to register for 3GPP access with the core network via the target AMF to which the wireless communication device is to be relocated from the currently serving AMF providing non-3GPP access to the core network, receiving a notification from the target AMF that the registration for 3GPP access is successful, and submitting, via an N3IWF enabling the wireless communication device to remain connected via non-3GPP access, a request for non-3GPP access to the core network to the target AMF to which the wireless communication device has been relocated.

In an eighth aspect a wireless communication device configured to access a core network, the wireless communication device being registered with the core network over non 3GPP access with a currently serving Access and Mobility Management Function (AMF) and further requests 3GPP access to the core network with a target AMF in a same Public Land Mobile Network (PLMN) as the non-3GPP access, comprising a processing unit and a memory, said memory containing instructions executable by said processing unit, whereby said wireless communication device (10) is operative to submit a request to register for 3GPP access with the core network via the target AMF to which the wireless communication device is to be relocated from the currently serving AMF providing non-3GPP access to the core network, receive a notification from the target AMF that the registration for 3GPP access is successful; and submit, via a Non-3GPP Interworking Function (N3IWF) enabling the wireless communication device to remain connected via non-3GPP access, a request for non-3GPP access to the core network to the target AMF to which the wireless communication device has been relocated.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 illustrates an AMF according to an embodiment;

FIG. 6 illustrates another AMF according to an embodiment;

FIG. 7 illustrates an N3IWF according to an embodiment; and

FIG. 8 illustrates a UE according to an embodiment.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
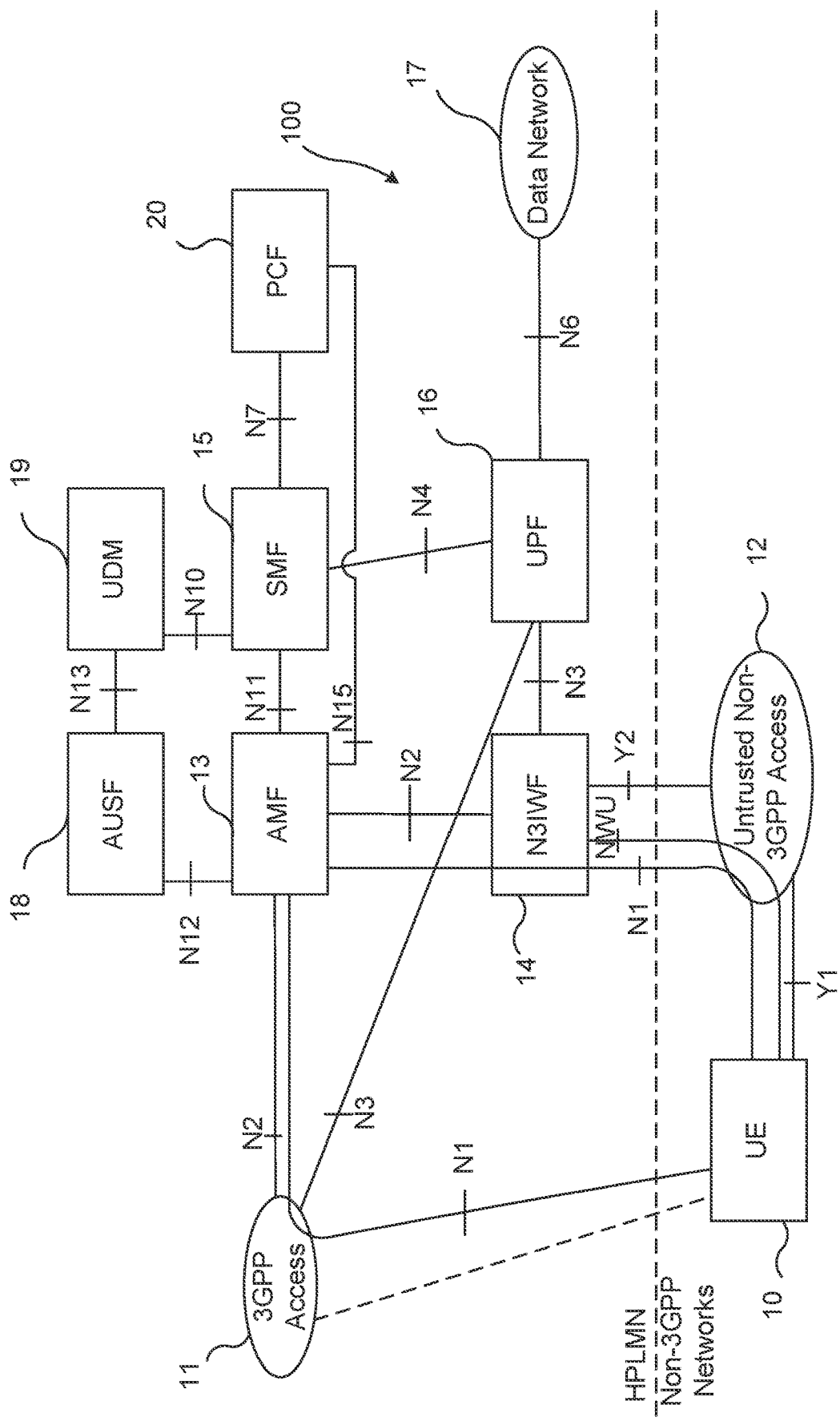
FIG. 1 illustrates a UE registering for 3GPP access with a core network via a 3GPP AN1, while registering for non-3GPP access with the core network.

FIG. 1 illustrates a UE 10 registering for 3GPP access with a core network 100 via a 3GPP AN 11, while registering for non-3GPP access with the core network 100 via a non-3GPP AN 12, and has previously been described in detail.

Figure 2:
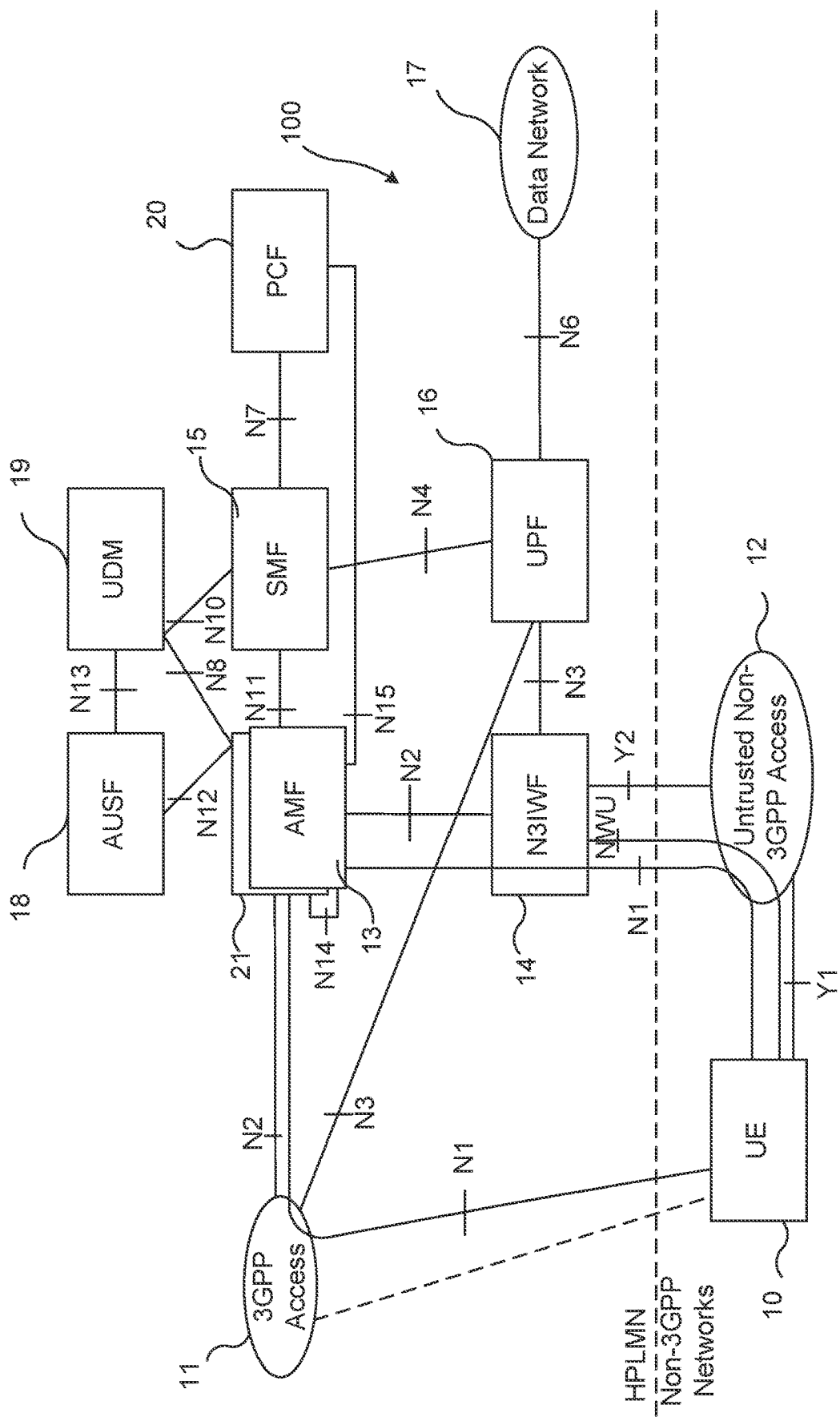
FIG. 2 illustrates the UE registering with the core network of FIG. 1, but where relocation is performed from a currently serving AMF to a new AMF according to an embodiment.

FIG. 2 illustrates the UE 10 registering with the core network 100 of FIG. 1, but where relocation is performed from a currently serving AMF 13 to a new AMF 21 according to an embodiment.

Figure 3:
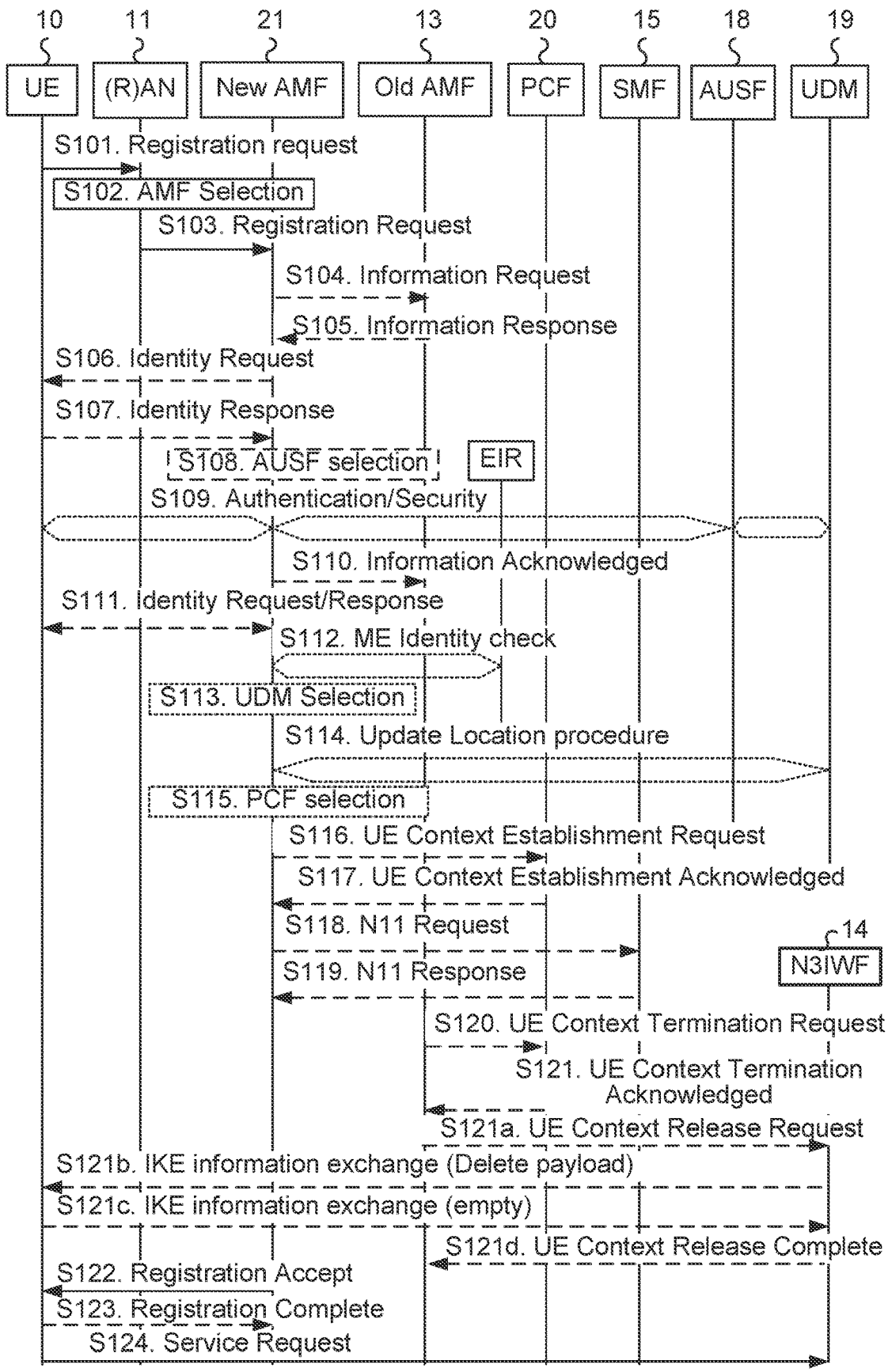
FIG. 3 shows a signalling diagram illustrating an embodiment of the invention where a UE is registered with a core network over non-3GPP access via a currently serving AMF but is to be relocated to a new AMF.

FIG. 3 shows a signalling diagram illustrating an embodiment of the invention where a UE 10 is registered with a core network over non-3GPP access via a currently serving AMF 13. Since the service area of the currently serving AMF 13 may not cover the entire PLMN, AMF re-selection may be required during mobility when the UE 10 leaves the coverage area of a current AMF 13. Hence, for coverage, the UE 10 registers with a new AMF 21, i.e. a target AMF, over 3GPP access with the core network. When the UE 10 is registered for both 3GPP and non-3GPP access in the same PLMN, a single AMF shall be used for the UE 10.

In step S101, the UE 10 submits a registration request to 3GPP AN 11 comprising a 5G Subscription Permanent Identifier (SUPI) or a Temporary User ID. In step S102, the 3GPP AN 11 selects the new "target" AMF 21 for providing coverage to the UE 10. If the selected AMF 21 cannot serve the UE 10, the selected AMF selects another appropriate AMF for the UE 10.

In step S103, the 3GPP AN 11 forwards the registration request including the SUPI or the Temporary User ID to the selected AMF, i.e. to the target AMF 21.

The target AMF 21 will in step S104 in its turn submit an Information Request to the currently serving AMF 13, which replies to the Information Request with an Information Response UE Mobility Management (MM) context which includes a UE permanent ID. The Information Response will further comprise identifier(s) of any ongoing non-3GPP access PDU session(s).

If the SUPI was not provided initially by the UE 10 (or was not provided by the currently serving AMF 13) the target AMF 21 may submit an Identity Request to the UE 10 in step S106, which accordingly replies with an Identity Response in step S107.

The target AMF 21 may decide to invoke an AUSF 18. In that case, the target AMF 21 shall, based on the SUPI, select an AUSF in step S108. If so, the AUSF 18 shall initiate authentication of the UE 10 and NAS security functions in step S109.

If the currently serving AMF 13 has changed since the last registration, the target AMF 21 acknowledges the transfer of UE MM context in step S110. If the authentication/security procedure fails, then the registration is rejected, and the target AMF 21 sends a reject indication to the currently serving AMF 13. The currently serving AMF 13 continues as if the Information Request was never received.

If a Permanent Equipment Identifier (PEI) was not provided by the UE 10 nor retrieved from the currently serving AMF 13, an Identity Request procedure is initiated by the target AMF 21 sending an Identity Request message to the UE 10 to retrieve the PEI in step S111.

Optionally, the target AMF 21 initiates Mobile Equipment (ME) identity check with an Equipment Identity Register (EIR) in step S112.

Further, the target AMF 21 may select a UDM 19 based on the SUPI in step 113. If the currently serving AMF 13 has changed since the last registration, or if there is no valid subscription context for the UE 10 in the currently serving AMF 13, or if the UE 19 provides a SUPI which does not refer to a valid context in the currently serving AMF 13, the target AMF 21 initiates an Update Location procedure in step S114. This will include that UDM initiates Cancel Location to the currently serving AMF 13. The currently serving AMF 13 removes the MM context and notifies all possibly associated SMF(s), and the target AMF 21 creates an MM context for the UE 10 after receiving the AMF related subscription data from the UDM 19.

In step S115, the target AMF 21 may select a PCF 20 based on the SUPI. Thereafter, in step S116, the target AMF 21 submits to the PCF 20 a UE Context Establishment Request thereby requesting the PCF 20 to apply operator policies for the UE 10, which is followed by a UE Context Establishment Acknowledged in step S117.

Now, since a change in AMF is to take place, i.e. a change is to be undertaken from the currently serving AMF 13 to the target AMF 21, the target AMF 21 notifies each SMF 15 that it will serve the UE 1 with an N11 Request in step S118, which is followed by an N11 response in step S119.

The target AMF 21 verifies PDU session status from the UE 10 with the available SMF information. The target AMF 21 requests the SMF 15 to release any network resources related to PDU sessions that are not active in the UE 10.

If the currently serving AMF 13 previously requested UE context to be established in the PCF 20, it terminates the UE context in the PCF in step S120 with a UE Context Termination Request and accordingly a UE Context Termination Acknowledged is submitted by the PCF 20 in step S121.

Now, in the present embodiment, the currently serving AMF 13 sends a UE Context Release Request to the N3IWF 14 in step S121*a*, which is the trigger for the N3IWF 14 to remove all UE context information such that the UE 10 successfully can be re-located to the target AMF 21.

Optionally, the N3IWF may engage in an IKE exchange procedure with the UE 10 in steps S121*b* and S121*c*.

In step S121*d*, the N3IWF 14 replies to the UE Context Release Request with a UE Context Release Complete to notify the currently serving AMF 14 that the UE context information has been removed, thereby advantageously facilitating re-location of the UE 10 from the currently serving AMF 13 to the target AMF 21 in order to provide a single AMF handling the access of the UE 10 in the core network.

Finally, in step S122, the target AMF 21 sends a Registration Accept message to the UE 10 indicating that the registration has been accepted. Temporary User ID is included if the target AMF 21 allocates a new Temporary User ID.

Further, in an embodiment, the UE 10 submits in step S124, via the N3IWF 14, a request for non-3GPP access to the core network 100 to the target AMF 21 to which the wireless communication device 10 has been relocated, in order to remain connected via non-3GPP access.

Mobility restrictions are included in case mobility restrictions apply for the UE 10. The target AMF indicates the PDU session status to the UE 10. The UE removes any internal resources related to PDU sessions that are not marked active in the received PDU session status. If the PDU session status information was in the Registration Request, the target AMF 21 shall indicate the PDU session status to the UE 10.

The UE 10 sends a Registration Complete message to the target AMF 21 in step S123 to acknowledge if a new Temporary User ID was assigned.

Figure 4:
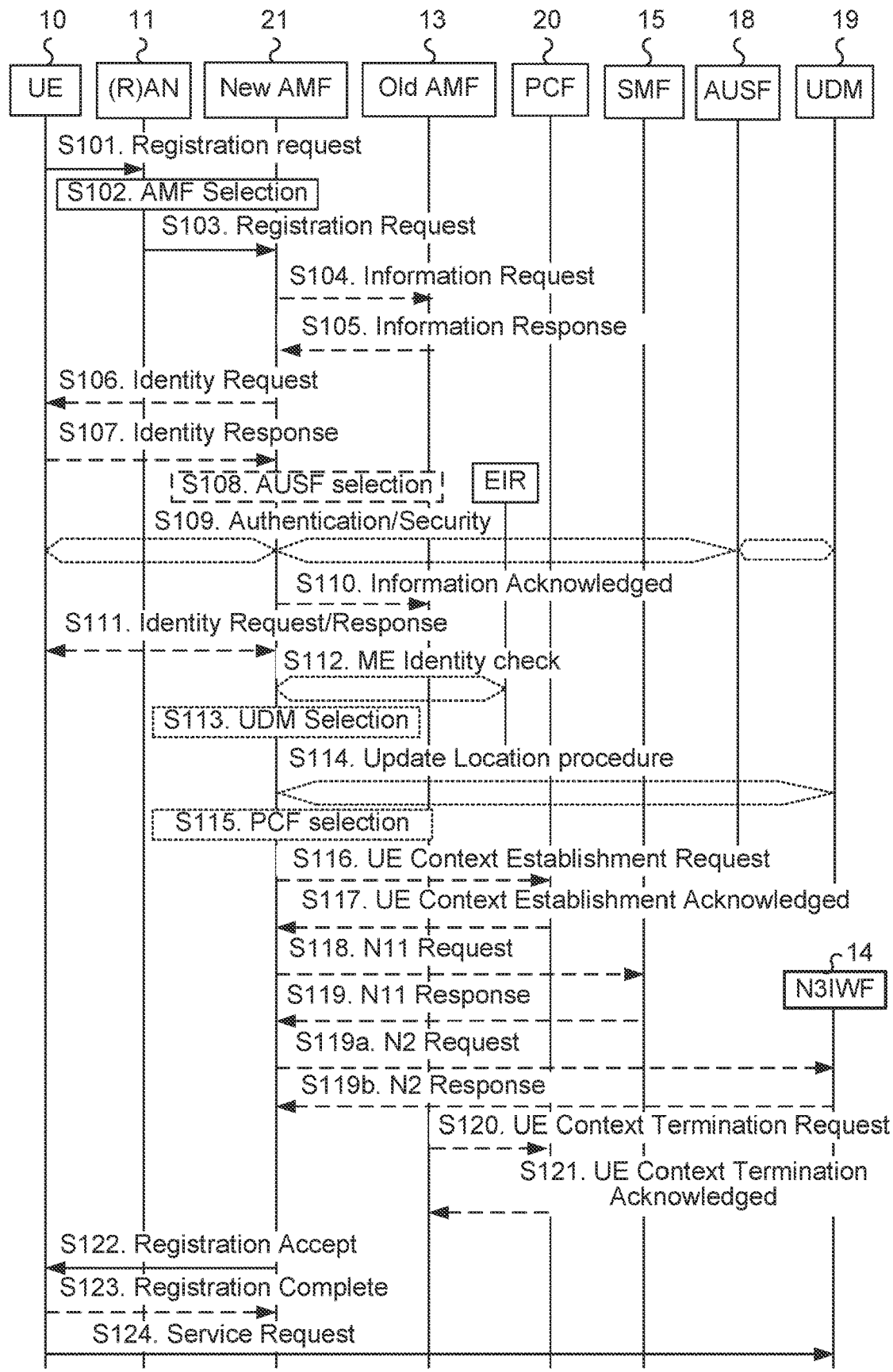
FIG. 4 shows a signalling diagram illustrating another embodiment of the invention where a UE is registered with a core network over non-3GPP access via a currently serving AMF but is to be relocated to a new AMF.

FIG. 4 shows a signalling diagram illustrating another embodiment of the invention where a UE 10 is registered with the core network over non-3GPP access via a currently serving AMF 13 but where relocation of the UE 10 to the target AMF 21 is to be performed for 3GPP access.

In step S101, the UE 10 submits a registration request to 3GPP AN 11 comprising a SUPI or a Temporary User ID. In step S102, the 3GPP AN 11 selects the new "target" AMF 21 for providing coverage to the UE 10. If the selected AMF 21 cannot serve the UE 10, the selected AMF selects another appropriate AMF for the UE 10.

In step S103, the 3GPP AN 11 forwards the registration request including the SUPI or the Temporary User ID to the selected AMF, i.e. to the target AMF 21.

The target AMF 21 will in step S104 in its turn submit an Information Request to the currently serving AMF 13, which replies to the Information Request with an Information Response UE MM context in step 105 which includes a UE permanent ID. The Information Response will further comprise identifier(s) of any ongoing non-3GPP access PDU session(s), and N3IWF destination information for the UE 10 in order for the target AMF 21 to be able to contact the correct N3IWF 14 subsequently in step S119*a*.

If the SUPI was not provided initially by the UE 10 (or was not provided by the currently serving AMF 13) the target AMF 21 may submit an Identity Request to the UE 10 in step S106, which accordingly replies with an Identity Response in step S107.

The target AMF 21 may decide to invoke an AUSF 18. In that case, the target AMF 21 shall, based on the SUPI, select an AUSF in step S108. If so, the AUSF 18 shall initiate authentication of the UE 10 and NAS security functions in step S109.

If the currently serving AMF 13 has changed since the last registration, the target AMF 21 acknowledges the transfer of UE MM context in step S110. If the authentication/security procedure fails, then the registration is rejected, and the target AMF 21 sends a reject indication to the currently serving AMF 13. The currently serving AMF 13 continues as if the Information Request was never received.

If a PEI was not provided by the UE 10 nor retrieved from the currently serving AMF 13, an Identity Request procedure is initiated by the target AMF 21 sending an Identity Request message to the UE 10 to retrieve the PEI in step S111.

Optionally, the target AMF 21 initiates ME identity check with an EIR in step S112.

Further, the target AMF 21 may select a UDM 19 based on the SUPI in step 113. If the currently serving AMF 13 has changed since the last registration, or if there is no valid subscription context for the UE 10 in the currently serving AMF 13, or if the UE 19 provides a SUPI which does not refer to a valid context in the currently serving AMF 13, the target AMF 21 initiates an Update Location procedure in step S114. This will include that UDM initiates Cancel Location to the currently serving AMF 13. The currently serving AMF 13 removes the MM context and notifies all possibly associated SMF(s), and the target AMF 21 creates an MM context for the UE 10 after receiving the AMF related subscription data from the UDM 19.

In step S115, the target AMF 21 may select a PCF 20 based on the SUPI. Thereafter, in step S116, the target AMF 21 submits to the PCF 20 a UE Context Establishment Request thereby requesting the PCF 20 to apply operator policies for the UE 10, which is followed by a UE Context Establishment Acknowledged in step S117.

Now, since a change in AMF is to take place, i.e. a change is to be undertaken from the currently serving AMF 13 to the target AMF 21, the target AMF 21 notifies each SMF 15 that it will serve the UE 1 with an N11 Request in step S118, which is followed by an N11 response in step S119.

The target AMF 21 verifies PDU session status from the UE 10 with the available SMF information. The target AMF 21 requests the SMF 15 to release any network resources related to PDU sessions that are not active in the UE 10.

Now, in the present embodiment, the target AMF 21 notifies (using the N3IWF destination information received in step S105) the N3IWF 14 by submitting an N2 Request in step S119a to redirect any further signalling of the UE 10 from the currently serving AMF 13 to the target AMF 21, which in an embodiment further may include re-locating any ongoing PDU session(s) from the currently serving AMF 13 to the target AMF 21, thereby advantageously facilitating re-location of the UE 10 from the currently serving AMF 13 to the target AMF 21 in order to provide a single AMF handling the access of the UE 10 in the core network.

The N3IWF 14 may reply by sending an N2 Response in step S119b. If the currently serving AMF 13 previously requested UE context to be established in the PCF 20, it terminates the UE context in the PCF in step S120 with a UE Context Termination Request and accordingly a UE Context Termination Acknowledged is submitted by the PCF 20 in step S121.

Finally, in step S122, the target AMF 21 sends a Registration Accept message to the UE 10 indicating that the registration has been accepted. Temporary User ID is included if the target AMF 21 allocates a new Temporary User ID.

Further, in an embodiment, the UE 10 submits in step S124, via the N3IWF 14, a request for non-3GPP access to the core network 100 to the target AMF 21 to which the wireless communication device 10 has been relocated, in order to remain connected via non-3GPP access.

Mobility restrictions are included in case mobility restrictions apply for the UE 10. The target AMF indicates the PDU session status to the UE 10. The UE removes any internal resources related to PDU sessions that are not marked active in the received PDU session status. If the PDU session status information was in the Registration Request, the target AMF 21 shall indicate the PDU session status to the UE 10.

The UE 10 sends a Registration Complete message to the target AMF 21 in step S123 to acknowledge if a new Temporary User ID was assigned.

With reference to FIGS. 5, 6, 7 and 8, the steps of the methods performed by the currently serving AMF 13, the target AMF 21, the N3IWF 14, and the UE 10 respectively, according to embodiments as previously has been described are in practice performed by a processing unit 30, 40, 50, 60 embodied in the form of one or more microprocessors arranged to execute a computer program 31, 41, 51, 61 downloaded to a suitable storage volatile medium 32, 42, 52, 62 associated with the microprocessor, such as a Random Access Memory (RAM), or a non-volatile storage medium such as a Flash memory or a hard disk drive. The respective processing unit 30, 40, 50, 60 is arranged to cause the currently serving AMF 13, the target AMF 21, the N3IWF 14, and the UE 10, respectively, to carry out the methods according to embodiments when the appropriate computer program 30, 40, 50, 60 comprising computer-executable instructions is downloaded to the storage medium 32, 42, 52, 62 and executed by the processing unit 30, 40, 50, 60. The storage medium 32, 42, 52, 62 may also be a computer program product comprising the computer program 31, 41, 51, 61. Alternatively, the computer program 31, 41, 51, 61 may be transferred to the storage medium 32, 42, 52, 62 by means of a suitable computer program product, such as a Digital Versatile Disc (DVD) or a memory stick. As a further alternative, the computer program 31, 41, 51, 61 may be downloaded to the storage medium 32, 42, 52, 62 over a network. The processing unit 30, 40, 50, 60 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

LIST OF ABBREVIATIONS

AMF—Access and Mobility Management Function
AN—Access Network
ASIC—Application Specific Integrated Circuit
AUSF—Authentication Server Function
CPLD—Complex Programmable Logic Device
DSP—Digital Signal Processor
DVD—Digital Versatile Disc
DR—Equipment Identity Register
FPGA—Field-Programmable Gate Array
ME—Mobile Equipment
MM—Mobility Management
NAS—Non-Access Stratum
N3IWF—Non-3GPP Interworking Function
PCF—Policy and Charging Function
PDU—Protocol Data Unit
PEI—Permanent Equipment Identifier
PLMN—Public Land Mobile Network
RAM—Random Access Memory
RM—Registration Management
SMF—Session Management Function
SUPI—Subscription Permanent Identifier
UDM—Unified Data Management
UE—User Equipment
UPF—User Plane Function
3GPP—3rd Generation Partnership Project
5G—Fifth Generation

The invention claimed is:

1. A method performed by a serving Access and Mobility Management Function (AMF) serving a wireless communication device, comprising:
   receiving, from a target AMF, a request for information regarding the wireless communication device;
   submitting, in reply to the request for information, a current user equipment (UE) context of the wireless communication device and an identifier of an ongoing non 3rd Generation Partnership Project (non-3GPP) access Protocol Data Unit (PDU) session for the wireless communication device; and notifying a Non-3GPP Interworking Function (N3IWF) to remove the current UE context, wherein the N3IWF is configured to enable the wireless communication device to attach to a core network over non-3GPP access.

2. A method performed by a target Access and Mobility Management Function (AMF) of a core network, comprising:

receiving a request of the wireless communication device to register for 3GPP access with the core network;

acquiring a current user equipment (UE) context of the wireless communication device, an identifier of an ongoing non-3rd Generation Partnership Project (non-3GPP) access Protocol Data Unit (PDU) session, and destination information for a Non-3GPP Interworking Function (N3IWF) associated with the wireless communication device for enabling the wireless communication device to attach to the core network;

notifying a Session Management Function (SMF) handling the ongoing non-3GPP access PDU session that the wireless communication device will be relocated from the currently serving AMF to the target AMF;

notifying the N3IWF designated by the destination information to redirect any further signalling of the wireless communication device from the currently serving AMF to the target AMF; and notifying the wireless communication device that the registration with the target AMF for a 3GPP access is successful.

3. The method of claim 2, further comprising notifying the N3IWF to re-locate the ongoing PDU session from the currently serving AMF to the target AMF.

4. The method of claim 2, further comprising acquiring one or more of: a Registration Management context of the wireless communication device, a Mobility Management context of the wireless communication device, or registration state of the wireless communication device.

5. A method performed by a Non-3rd Generation Partnership Project (3GPP) Interworking Function (N3IWF) enabling a wireless communication device (WCD) to attach to a core network over non-3GPP access, to facilitate relocation of the wireless communication device from a source Access and Mobility Management Function (AMF) currently serving the WCD over non-3GPP access to a target AMF which is to serve the WCD over 3GPP access, comprising:

receiving, from the target AMF, a redirect request to redirect signalling of the WCD from the source AMF currently serving the WCD to the target AMF;

after receiving the redirect request, receiving signalling transmitted by the WCD; and as a result of receiving the redirect request transmitted by the target AMF, transmitting the received signalling to the target AMF rather than the source AMF.

6. The method of claim 5, further comprising receiving a request from the target AMF to re-locate ongoing PDU sessions for the WCD from the currently serving AMF to the target AMF.

7. A method performed by a wireless communication device (WCD), the wireless communication device being registered with a core network over non-3rd Generation Partnership Project (3GPP) access with a currently serving Access and Mobility Management Function (AMF), comprising:

submitting a request to register for 3GPP access with the core network via a target AMF to which the wireless communication device is to be relocated from the currently serving AMF providing non-3GPP access to the core network;

receiving a notification from the target AMF that the registration for the 3GPP access is successful; and submitting to the target AMF, via a Non-3GPP Interworking Function (N3IWF), a request for non-3GPP access to the core network.

8. The method of claim 5, wherein the signalling transmitted by the WCD is a service request message, not a registration request message.

9. The method of claim 5, wherein the redirect request is an N2 Request message.

10. The method of claim 7, wherein submitting the request for non-3GPP access to the core network comprises transmitting a service request to the N3IWF.

* * * * *